United States Patent
Srinivasan et al.

(10) Patent No.: US 7,421,278 B2
(45) Date of Patent: Sep. 2, 2008

(54) METHOD AND APPARATUS FOR TIME-AWARE AND LOCATION-AWARE MARKETING

(75) Inventors: Kannan Srinivasan, Gibsonia, PA (US); Michael I. Shamos, Pittsburgh, PA (US)

(73) Assignee: Intellions, Inc., Mars, PA (US)

( * ) Notice: Subject to any disclaimer, the term of this patent is extended or adjusted under 35 U.S.C. 154(b) by 0 days.

(21) Appl. No.: 09/805,310

(22) Filed: Mar. 13, 2001

(65) Prior Publication Data
US 2002/0022488 A1 Feb. 21, 2002

Related U.S. Application Data

(60) Provisional application No. 60/188,887, filed on Mar. 13, 2000.

(51) Int. Cl.
*H04Q 7/20* (2006.01)
(52) U.S. Cl. .................... 455/456.3; 455/414.1
(58) Field of Classification Search ............. 455/456.3, 455/414.2, 414.3, 456.1, 456.2, 414.1, 414.4, 455/404.2
See application file for complete search history.

(56) References Cited

U.S. PATENT DOCUMENTS

| | | | |
|---|---|---|---|
| 5,930,699 A * | 7/1999 | Bhatia ..................... 455/456.3 |
| 6,343,317 B1 * | 1/2002 | Glorikian ..................... 709/218 |
| 6,405,034 B1 * | 6/2002 | Tijerino ................... 455/414.3 |
| 6,456,852 B2 * | 9/2002 | Bar et al. .................. 455/456.1 |
| 6,456,854 B1 * | 9/2002 | Chern et al. ................. 455/457 |
| 6,522,875 B1 * | 2/2003 | Dowling et al. .......... 455/414.3 |
| 6,526,275 B1 * | 2/2003 | Calvert ........................ 455/418 |
| 6,647,257 B2 * | 11/2003 | Owensby ................. 455/414.1 |
| 6,731,238 B2 * | 5/2004 | Johnson ................. 342/357.09 |
| 6,983,139 B2 * | 1/2006 | Dowling et al. .......... 455/414.2 |
| 7,035,625 B2 * | 4/2006 | Tijerino ................... 455/414.1 |

* cited by examiner

*Primary Examiner*—Blane J. Jackson
(74) *Attorney, Agent, or Firm*—Ference & Associates LLC (57) ABSTRACT

A method of communicating inferred information to a wireless communication device user is provided. That method includes determining a location of the wireless device, inferring a likely interest of the user from the location of the wireless device, and transmitting data related to the interest to the wireless device. The method may also ascertain time at the location of the wireless communication device user and infer an interest of the user from the time and location of the user. In addition, the method may include inferences made from information related to preferences of the user.

13 Claims, 3 Drawing Sheets

METHOD AND APPARATUS FOR TIME-AWARE AND LOCATION-AWARE MARKETING

CROSS-REFERENCE TO RELATED APPLICATIONS

This application claims priority of U.S. Provisional Application No. 60/188,887, filed Mar. 13, 2000, which is incorporated by reference herein in its entirety.

BACKGROUND OF THE INVENTION

1. Field of the Invention

The present invention relates to the transfer of information to a wireless communication device and, more particularly, to transferring information, inferred from the location of a wireless communication device and/or the time at the wireless communication device, to the wireless communication device.

2. Description of the Background

It is known that processors may communicate with wireless communication devices. Such processors may include, for example, a mainframe computer, a mini-computer, a micro-computer, a personal computer having, for example, a Microsoft® or Apple® operating system and a data storage device, or another device that is capable of storing and manipulating data. Such a processor may be connected to a public switched telephone network (PSTN) to provide connectivity with other devices. In addition, wireless networks are commonly used to accommodate communication between the PSTN and wireless communication devices. Such wireless networks include analog networks and digital networks utilizing any form of wireless technology including, for example, CDMA and/or TDMA, and any other radio network that employs intersystem messaging such as, for example, an IS-41 (Interim Standard-41) based system. Wireless communication devices that are capable of receiving and sending data, as well as voice communication, are also commonly used in such a wireless network. Digital and analog cellular telephones are common examples of such wireless communication devices.

It is also known to detect the position of an individual, vehicle, or device and to relay that position to a centralized database for tracking, providing emergency service, and the like. It is also known to provide web pages in which the location of an individual, vehicle, or device is plotted graphically for regular observation.

A user of a wireless communication device is likely to travel with the wireless communication device and is furthermore likely to desire information about the area in which that user is currently positioned. The user may furthermore wish to have information pertinent to the present time of day. In addition, the user may wish to be provided with information that is targeted to the preferences of that user.

Moreover, it is desirable to offer products and services to potential customers on a situational basis. For example, selling umbrellas while it is raining may appeal (1) to people who have forgotten to bring umbrellas with them but who must be outdoors; and (2) to people who are reminded by the rain that they need a new umbrella. By contrast, it is more difficult to sell umbrellas when the weather is dry.

Thus, a need exists for a system and method for providing a wireless communication device user with information pertinent to the current position of the user. That information may include product and service related information. Another need exists for a system and method for providing a wireless communication device user with information pertinent to the time of day at the location of the user. Yet another need exists for a system and method for providing a wireless communication device user with information targeted to the preferences of that user.

Another need exists for a method and system of exploiting situational selling opportunities in an electronic commerce setting.

SUMMARY OF THE INVENTION

In accordance with a particularly preferred form of the present invention, there is provided a method of communicating inferred information to a wireless communication device user. That method includes determining a location of the wireless device, inferring a likely interest of the user from the location of the wireless device, and transmitting data related to the interest to the wireless device. The method may also ascertain time at the location of the wireless communication device user and infer an interest of the user from the time and location of the user. In addition, the method may include inferences made from information related to preferences of the user.

Thus, the present invention offers the feature of providing a wireless communication device user with information pertinent to the current position of the user. The present invention also provides the feature of providing a wireless communication device user with information pertinent to the time of day at the location of the user. In addition, the present invention provides the feature of providing a wireless communication device user with information pertinent to the preferences of that user.

The present invention also provides a method and system for detecting situational selling opportunities and contacting prospective customers during such situations. Accordingly, the present invention provides solutions to the shortcomings of prior wireless notification systems and methods. Those of ordinary skill in the art will readily appreciate, therefore, that these and other details, features, and advantages will become further apparent in the following detailed description of the preferred embodiments.

BRIEF DESCRIPTION OF THE DRAWINGS

In the accompanying Figures, there are shown present preferred embodiments of the invention wherein like reference numerals are employed to designate like parts and wherein.

DETAILED DESCRIPTION

It is to be understood that the Figures and descriptions of the present invention included herein illustrate and describe elements that are of particular relevance to the present invention, while eliminating, for purposes of clarity, other elements found in typical processors, wireless communication devices 34, and communication networks. Because the construction and implementation of such other elements are well known in the art, and because a discussion of them would not facilitate a better understanding of the present invention, a discussion of those elements is not provided herein. It is also to be understood that the embodiments of the present invention that are described herein are illustrative only and are not exhaustive of the manners of embodying the present invention. For example, it will be recognized by those skilled in the art that the present invention may be readily adapted to sending data to a wireless processor or computing device communicating on a wireless communication network in addition to a wireless telecommunication device. It will also be recognized by those skilled in the art that a wireless device or a device connected to a public switched telephone network (PSTN) may act as an information originating entity. Likewise, either a wireless device or a device connected to a PSTN may act as a message receiving entity which will be referred to as a wireless communication device in the examples provided herein.

Any reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Figure 1:
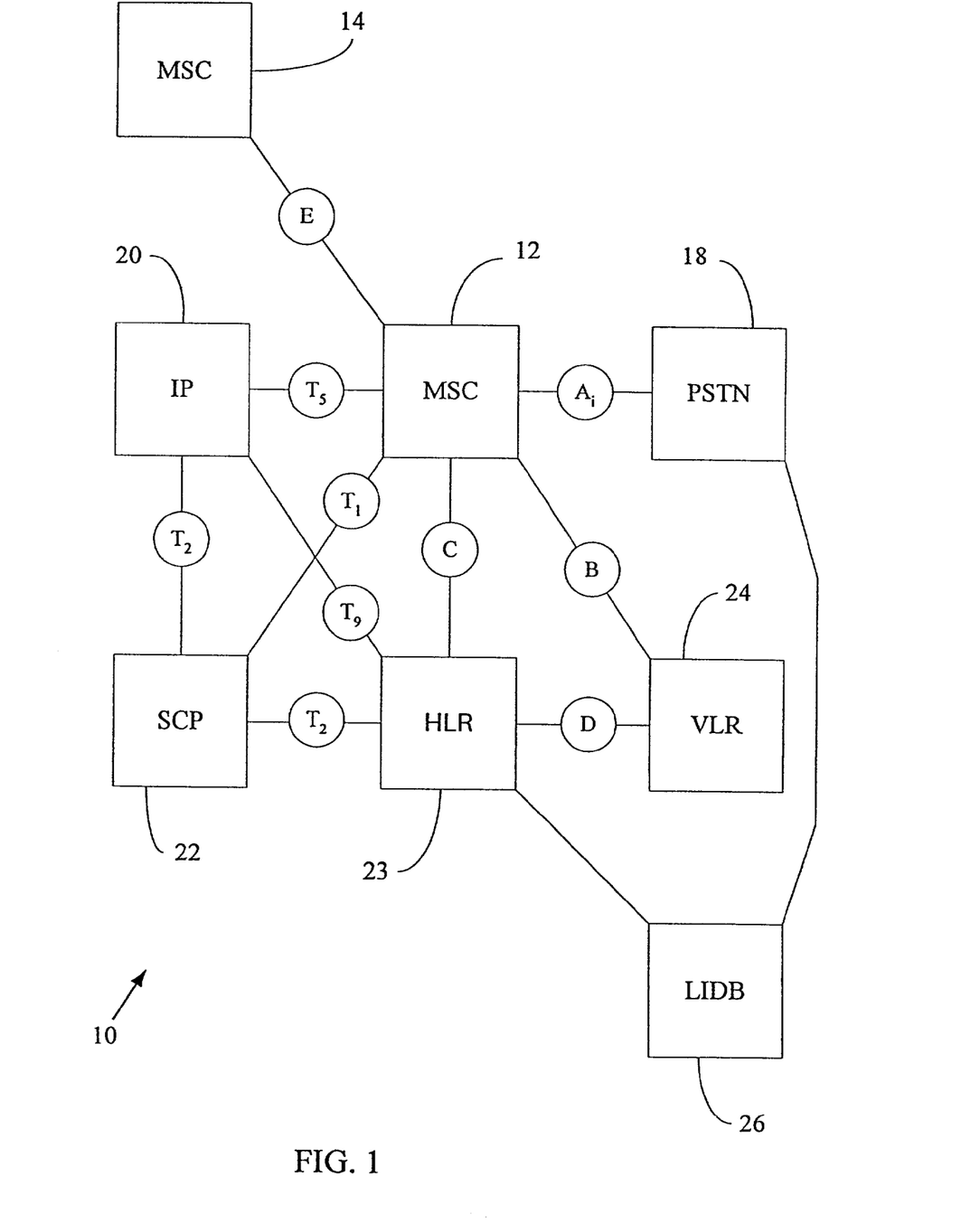
FIG. 1 is a schematic diagram of a model wireless network.

Referring now to the drawings for the purposes of illustrating the present preferred embodiments of the invention only and not for the purposes of limiting the same, FIG. 1 illustrates an example of a wireless network 10 having interconnected network entities. That network reference model 10 appears in Chapter-I (or Part-1) of revision-D of the IS-41 wireless intersystem operation standard. Revision-D of the IS-41 standard is incorporated herein by reference in its entirety. Copies of current and previous revisions of the IS-41 standard may be obtained from Global Engineering Documents, 15 Inverness Way East, Sales-C303B, Englewood, Colo., USA 80112-9649. FIG. 1 and a description of the network entities depicted therein and their interaction are included herein as a general overview of a standard wireless network. The present invention does not necessarily utilize every network entity depicted in FIG. 1 and, furthermore, may utilize additional entities not depicted in FIG. 1.

The IS-41 standard is more recently referred to as a TIA/EIA-41 standard, where "TIA" stands for Telecommunications Industry Association and "EIA" stands for Electronics Industry Association. However, the following discussion uses the designations IS-41 and TIA/EIA-41 interchangeably. Although the discussion herein focuses on IS-41 messages to accomplish wireless schedule notification, it will be understood by one skilled in the art that the methodology described herein may be implemented with other non-IS-41 messages having functionality similar to that described hereinbelow.

It is known in the art that IS-41 is the technical standard that specifies the network model, functions, protocols, and services that provide mobile telecommunications networks intersystem operations. The IS-41 specification also provides a standard protocol for the operations that enable subscriber mobility between two mobile switching centers (MSCs) in a single wireless network or in two different wireless networks operated by a single or two different service providers. Protocols used to communicate between a wireless device and another device are also known. In other words, the IS-41 standard specifies the necessary signaling mechanism to accomplish seamless communication in the mobile world. Following is a brief description of each of the network entities illustrated in FIG. 1.

The network entities depicted in FIG. 1 include an anchor MSC 12, a visiting (or serving) MSC 14, PSTN 18, an intelligent peripheral (IP) 20, a service control point (SCP) 22, a home location register (HLR) 23, a visitor location register (VLR) 24, and a line information database (LIDB) 26. These network entities represent functional blocks or units that perform various logical functions that are implementation-independent. In other words, one or more of the above-mentioned network entities may be constructed in different physical configurations by different mobile service providers and, hence, the model shown in FIG. 1 is a symbolic representation of functions that may be included on a wireless network and does not imply either a specific physical implementation of a network entity shown therein or a specific interconnection between two or more network entities shown therein. For example, the discussion below identifies the VLR 24 as associated with the anchor MSC 12 as well as with the serving MSC 14. The diagram in FIG. 1, however, does not show a direct physical interconnection between the VLR 24 and the serving MSC 14. The sharing of the VLR 24 may be possible, for example, when both of the mobile switching centers 12 and 14 are operated by a common service provider.

It is therefore emphasized that the arrangement shown in FIG. 1 is for illustration only. The network entities shown in FIG. 1 may not represent an actual physical connection, especially when call-routing involves many more cells and, hence, many more network entities, in a wireless network. For example, in one embodiment that is not illustrated in the Figures, the serving MSC 14 may have its own HLR and VLR and may be maintained by a service provider that is different from the service provider maintaining the anchor MSC 12 and its associated network entities. A service provider may furthermore choose not to provide all the network entities or all the interconnections illustrated in FIG. 1 in a given geographic area or cell. In addition, more than one functional unit may be implemented on a single physical device, or, alternatively, some functional blocks may represent separate physical devices. For example, one physical device may include the functionality of the IP 20, HLR 23, and the SCP 22.

Each network entity is shown interconnected via interfaces represented by different interface reference points. For example, the anchor MSC 12 and the visiting (or serving) MSC 14 are shown connected via the interface reference point E, and the anchor MSC 12 and its associated HLR 23 are shown connected via the interface reference point C. Other interface reference points are also illustrated in FIG. 1. These interface reference points represent the point of connection between two physical or logical network entities. A point of connection is defined by functional and signaling characteristics and may define the operational responsibility of the interconnected network entities. Thus, the signaling characteristic of the B interface may be different from that of the $T_1$, interface, and the signaling characteristic of the C interface may be different from that of the D interface, etc.

It is noted that the terms "mobile subscriber", "network subscriber" and "mobile user" are used interchangeably hereinbelow. A "mobile subscriber" (not shown) may be a human individual who has subscribed to one or more mobile wireless services. The term "mobile subscriber," as used herein, also includes a mobile service user who uses the subscribed wireless service(s) with a mobile telephone handset or with a computer equipped for wireless communication or with any other similar device. Further, "mobile communication" may include voice, data or any other information communicated via a mobile telecommunications network.

The MSC is a functional entity that represents an automatic wireless message switching system. An MSC may be distinguished from a mobile telephone switching office, which refers to a physical wireless switching office including switching hardware, the physical building, the MSC, etc. An MSC is typically an interface for user traffic between a cellular network, PSTNs or other MSCs in the same or other networks. An MSC provides basic switching functions and coordinates the establishment of calls to and from cellular subscribers. Thus, an MSC is responsible for various call processing as well as mobile subscriber mobility management functions.

An MSC first receiving a call placed by a caller calling a mobile subscriber may be referred to as the "anchor MSC" (e.g., MSC 12), whereas an MSC that completes the call by delivering the call to the mobile subscriber may be referred to as the "serving MSC" (e.g., MSC 14). The geographic locations of the caller and the mobile subscriber at the time of call reception determines whether the anchor MSC 12 and the serving MSC 14 are the same or different.

The PSTN 18 may include a wire line telephone network carrying a call from an external network caller to a mobile subscriber or vice versa. The $A_i$ interface represents an interconnection between the PSTN 18 may switching center in the mobile network, here, the MSC 12. The PSTN 18 may include a digitally switched telephone network, a plain old telephone system (POTS), the Internet or other external networks, including a local area network (LAN), a wide area network (WAN) and another mobile network. It is known that mobile networks are capable of interoperating with other networks (e.g., PSTN 18) to complete calls.

The IP 20 is a network entity that may be a server or any other database capable of storing data including, for example, caller-specific information stored in "mailboxes" and messages received from or to be forwarded to a mobile subscriber. The IP 20 also includes a processor that interprets instructions which may, for example, be included in the message or received from other network nodes and then executes those instructions. In one embodiment, the IP 20 is part of the HLR 23. In another embodiment, a single server performs the storage function that may be performed by the IP 20 and the switching function that may be performed by the MSC 12. Alternatively, the IP 20 may be an independent physical entity in the wireless network. The IP 20 may also be able to perform multiple activities, e.g., activities similar to those performed by the SCP 22.

Interim Standard-41 (IS-41) for mobile telecommunications includes a Short Message Service (SMS), which is a wireless communication data service that is typically resident in the IP 20. Common communication protocols such as, for example, a standard pager protocol, the Internet protocol TCP/IP, and Simple Mail Transfer Protocol (SMTP) may furthermore be utilized to communicate information to and from the SMS. It should be noted, however, that a facility for converting messages conforming to certain protocols may be necessary to convert the data to an SMS readable format. An SMS is a messaging service that provides store-and-forward functions for the handling of short messages directed to or originating from the mobile subscribers. Thus, the SMS is able to store data and deliver that data to a wireless communication device 34 at a specified time. The SMS also has the capacity to compare an address and sub-address received with a message to an address and sub-address of a previously received and stored message and to replace the stored message with the new message or delete the stored message when the addresses and sub-addresses match. In its most basic form, the SMS functions in conjunction with an originating Short Message Entity (SME) and a receiving SME. The originating and sending SMEs may be wireless communication devices 34. Because the SMS is also compatible with packet-switched networks, electronic mail services, paging services and other commonly used messaging services, however, one or both of the SMEs may alternately be a processor, a personal computer, or another device that utilizes one or more of those messaging services.

A cellular wireless network may interconnect with a Signaling System No. 7 (SS7) network as a backbone network to transport IS-41 signaling messages through the mobile telecommunications network. SS7 packets may be used to convey signaling information from an originating point to a destination point through multiple switching nodes in the mobile network, which may encompass more than one wireless network operated by one or more service providers. SS7-based transactions may query databases and invoke functions at remote points throughout the mobile wireless network to establish and maintain calls and to perform reliable call management functions. An SS7 backbone network may be owned and operated by the same service provider that operates the interconnected wireless network. Alternatively, a wireless service provider may, for example, join an independent SS7 network provider to accomplish desired call routing. An SCP, for example SCP 22, is an end signaling point in an SS7 network that performs transaction processing of remote operations. The SCP 22 may support a database to perform the required operations, e.g., processing of calling card information. As previously noted, the HLR 23 may perform as an SCP in a given wireless network configuration.

The location registers, e.g., the HLR 23 and the VLR 24, are data-based systems that assist in controlling mobile subscriber services and contain the records and stored information related to mobile subscribers of a particular mobile service provider. The location registers are queried by other network entities to obtain the current status, location, and other information to support calls to and from mobile users within the wireless network. Location registers may also contain network address translation information to assist in the routing of calls to the appropriate network destination.

The HLR 23 is typically a primary database repository of subscriber information used to provide control and intelligence in wireless networks. The HLR 23 thus contains a record of subscriber information such as features selected by the subscriber as part of the mobile service plan (e.g., call forwarding, calling name service, etc.), status of the subscriber (e.g., active, inactive, suspended service, etc.), the subscriber's mobile directory number (i.e., the number a calling party has to call to reach the mobile subscriber), information about the current geographic location of the mobile subscriber, etc. The HLR 23 may be shared by more than one MSC 12 or 14. The HLR 23 is generally managed by the wireless service provider company and represents the "home" database of subscribers who have subscribed to the wireless service in that home area served by the wireless service provider.

The VLR 24 is a database that primarily maintains temporary records associated with individual network subscribers. Thus, the VLR 24 represents a "visitor's" database for mobile subscribers who are being served in a defined local area. The VLR 24 is also typically managed by a wireless service provider. The VLR 24 and the HLR 23 may be managed by the same or by different wireless service providers depending on the current geographic location of the mobile subscriber in the wireless network. The term "visitor" may refer to a mobile subscriber who is being served by one or more systems in the home service area, or a mobile subscriber who is roaming in a non-home, or "visited," service area (i.e., a service area of a service provider that is different from the entity from whom the mobile subscriber purchases wireless service). The VLR 24 generally contains subscriber location, status, and service feature information that is derived from the relevant HLR, here, the HLR 23. The serving MSC 14 may access its associated VLR 24 to retrieve information therefrom for the handling of calls to and from visiting subscribers. Similar to the HLR 23, the VLR 24 may also serve one or more MSCs.

The LIDB database 26 is typically maintained by each telecommunications service provider as part of its subscriber account management. The LIDB database 26 may store caller-specific information (also interchangeably referred to herein as "calling name information"), e.g., the name of the caller, the telephone number of the caller, etc. The LIDB database 26 may be used, for example, when a call sent to a mobile subscriber involves the PSTN 18 as part of the call connection process. Thus, the calling party information may be placed in the LIDB database 26 when a call is placed from the PSTN 18 to the wireless network. The external network, typically the PSTN 18, may store the calling name information in the LIDB database 26 for a number of reasons including, for example, to validate an identity of the caller in the case of collect calls or third party calls.

The present invention provides a method and system for communicating inferred information to a wireless communication device 34. The inference of the present invention may be a result of considering the location of the wireless communication device 34, the time of day at that location, and one or more preferences of the user of the wireless communication device 34. The preferences may, furthermore, be established by, for example, a user providing preference information or by tracking user selections over time to determine preferences through historic trends. The invention may operate to communicate information to a wireless communication device 34 only when that device 34 is operating and may, furthermore, assume that a user is located in close proximity to the device 34 when the device 34 is operating.

Inferences may also be made based on information actively used by others in the local area and/or information acted upon by others at a time proximate to the current time. For example, if there is an accident, drivers in the local area may be providing information about alternative routes. Inferring a hidden surge in demand, the alternative route information may be automatically pushed, or provided to, any customer who is approaching the local area.

Figure 2:
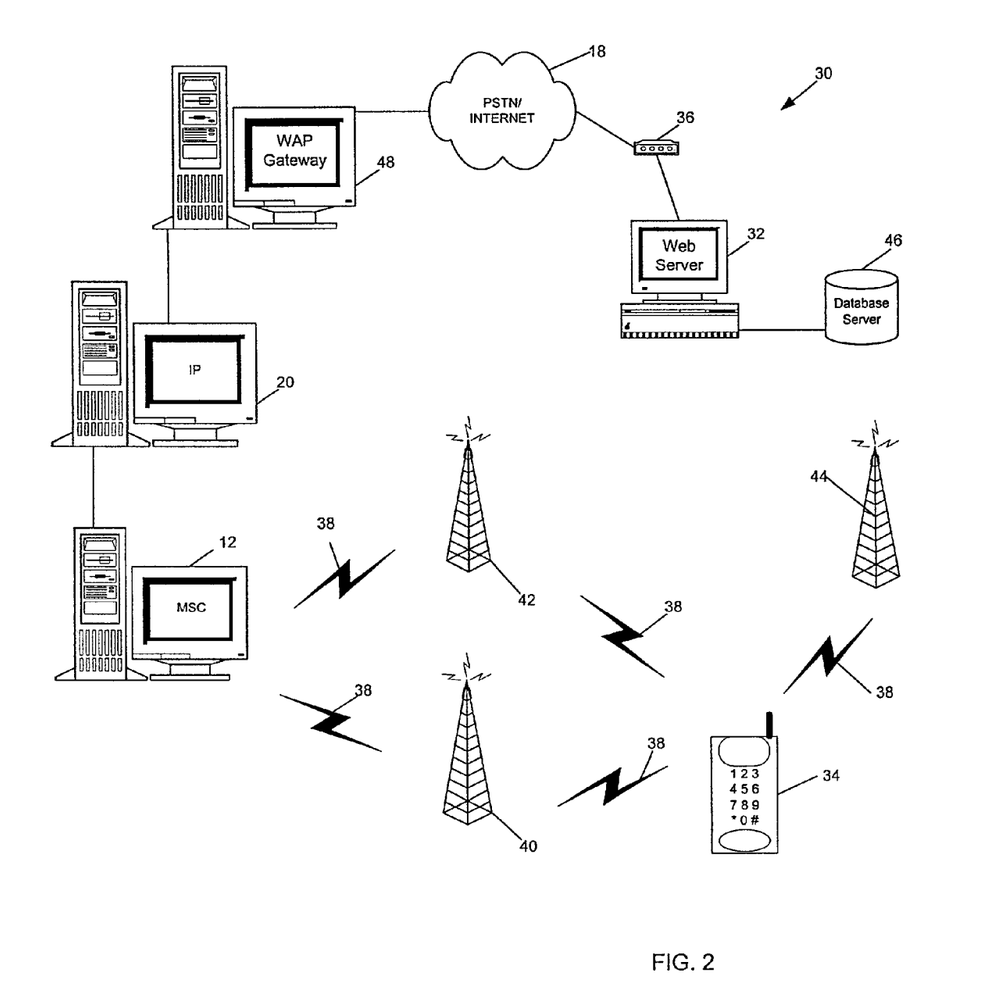
FIG. 2 is a schematic diagram illustrating a communication network connecting a processor to a wireless device.

FIG. 2 is a diagram illustrating a system 30 of the present invention for communicating inferred information to a wireless communication device 34. In the embodiment illustrated, the information originating entity 32 communicates with an intelligent peripheral (IP) 20 through a public switched telephone network (PSTN) 18 by way, for example, of a modem 36. The IP, in turn, communicates with a message receiving entity 34 through one or more mobile switching centers (MSCs) 12 and a wireless transmission signal 38. Of course communication may be performed by an alternative system utilizing, for example, a single server performing the functions of the IP 20 and the MSC 12. As illustrated, one or more relay stations 40 and 42 may be utilized to carry the wireless transmission signal 38.

It is possible to determine the location of the wireless communication device by location information transmitted by a GPS enabled device or by triangulating the location of the wireless device with respect to the Relay stations 40, 42 and 44. A short message service (SMS) may furthermore run on the IP 20 and may be utilized to pass location information from the wireless communication device 34 to the information originating entity 32 and to pass inferred information from the information originating entity 32 to the wireless communication device 34.

The information originating entity 32 may include a web server 32, a database server 46 and a device for communicating with the Internet or PSTN such as, for example, a modem 36. The web server 32 may be any processor-based device including, for example, a Sun E10K server. Likewise, the database server 46 may also be any processor based device including, for example, a Sun E10K server. The database server 46 may include a data storage facility which may operate using, for example, Oracle, Sybase, or DD2. Information stored in the database may include, for example, location dependent user preferences, historical data about past user selections and general user profile information. The web 46 server may include a wireless application protocol server and may run web server software such as, for example, Microsoft® IIS or Netscape NES. The web server 46 may also run application software for processing location information received from a user requesting user information from the database server and applying business logic for determining and providing appropriate information to the user. The web server 32 may connect through a network such as the Internet which transports data received from the web server 46 to an interface that communicates with a wireless network. That interface could, for example, be a wireless application protocol gateway 48 operated by a wireless communication provider. That information may then be passed, for example, to the IP 20.

The information originating entity 32 may, in another embodiment, be incorporated into the wireless network as a part of, for example, the IP 20.

Figure 3:
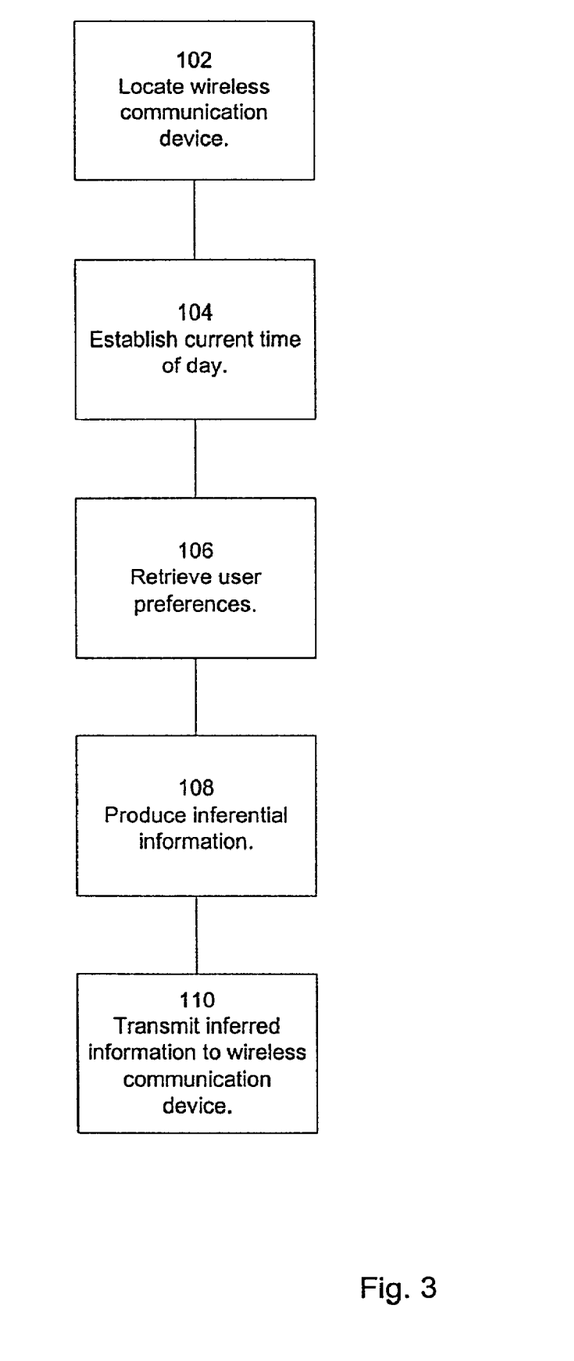
FIG. 3 is a flow diagram illustrating a method of providing inferred information to a wireless communication device.

FIG. 3 illustrates a process 100 of communicating inferred information to a wireless communication device 34. At 102, the location of the wireless communication device 34 is determined. In a certain embodiment, the current time of day at that location is established at 104 and the preferences of the normal user of that wireless communication device 34 are retrieved from a database at 106. At 108, an inference as to something in which the user may be interested is made based on the location. The time of day and/or preferences of the normal user of that device 34 may also be considered in making that inference. Information inferred from the location of the wireless communication device 34 and any time of day or user specific preferences that are available is forwarded to the user at 110.

The location of a wireless communication device 34 may be determined by any known method including by way of a global positioning system or "GPS" or by triangulation or other similar technologies using wireless communication towers in the vicinity of the wireless communication device 34.

In a first embodiment of the invention, wherein only the position of the wireless communication device 34 is used to make inferences, the invention will infer from the location of the wireless communication device 34 that the user may desire information related to that location. For example, if the invention recognizes that the wireless communication device 34 is approaching a mall, the invention may transmit a list of establishments operating in that mall to the wireless communication device 34. Moreover, the invention may provide additional levels of detailed information to the wireless communication device 34 as the wireless communication device 34 moves. For example, if the user of the wireless communication device 34 carries that device 34 into the mall and approaches a store, the invention may provide information to the wireless communication device 34 regarding featured goods or special pricing on goods sold by that store. If the user approaches a restaurant carrying the wireless communication device 34, the invention may provide a listing of menu items carried by that restaurant. If the user approaches a bank, the invention may provide information regarding the length of the queue in that bank and the estimated waiting time to be serviced by a teller as well as information regarding interest-bearing accounts and loan rates in that bank.

An information service provider may be the operator of the information originating entity 32. The information provided to the wireless communication device 34 by the present invention may be gathered by the information service provider and placed in a database saved in a storage device coupled to a server such as, for example, the database server 46 discussed hereinbefore. The information may be processed by application software running on the web server 32. In a certain embodiment of the present invention some or all of the information to be provided to the wireless communication device 34 is provided by advertisers wishing to make the user of the wireless communication device 34 aware of goods and/or services available near the locale of the wireless communication device 34. The information gathered into the database for provision to a user may be gathered from, for example, a search of static information available in that location such as, for example, stores that are known to exist in that area or services available in that location. Other static information may be gathered from secondary sources such as the commercial entity Infospace or a similar provider. Dynamic information may also be included such as, for example, weather data, traffic data, current waiting time for certain services, and current promotions being offered by merchants. Sources of such dynamic information may include enterprises making that information available to the information service provider. It will be recognized that the information service provider may charge a fee for inclusion of information related to an enterprise. Once the location-specific information has been stored in the database, it may be retrieved and transmitted to one or more wireless communication devices 34 that have entered a specified area.

The specified area may have predefined boundaries such that when a wireless communication device 34 subscribing to the information service of the present invention enters that bounded area the appropriate information will be transmitted to the wireless communication device 34. Of course, the service described herein may be transmitted to many wireless communication devices 34 in the same area or in different areas.

Information to be sent to a wireless communication device 34 by the present information service may be transmitted to a SMS by a communication protocol such as, for example, TCP/IP. The SMS may then transmit the short message to the appropriate wireless communication device 34. As will be recognized by one skilled in the art, the SMS may pass the information to the wireless communication device 34 immediately upon having capacity or may hold the information until a time specified in the short message passes.

In another embodiment of the present invention, time may be one of or the only parameter from which an inference is made. Thus, when the time of day at a wireless communication device 34 is known, the wireless device 34 may be provided with suggested places to have lunch prior to noon for example, or with alternate routes for commuting prior to 5:00 p.m. Time may, for example, be assumed to be current time in the area code in which the wireless communication device 34 is based. Alternately, where inferences are made from both location and time, time may be determined for the current location of the wireless communication device 34. It will be recognized that improved inferences may be made in many cases where both time and location are known. For example, where both time of day and location are known restaurants open for lunch in that particular location may be listed in the information provided to the wireless communication device 34 at noon when lunch is often desired and the listed restaurants may be limited to those near the present location of the wireless communication device 34. Restaurants listed in that example may include those within a predetermined area such as, for example, one mile of the current location, or they may include the nearest restaurants up to a number limit such as, for example, twenty. That limit may be defined by the information service provider or the user. If both location and time are known in the transportation routing example provided previously, lesser traveled routes in the vicinity of the wireless communication device 34 may be provided, for example, between the hours of 5:00 and 6:00 p.m. when the user may be expected to be travelling home.

Furthermore, the present invention may retain the location of a wireless communication device 34 over a period of time such that, where the wireless communication device 34 is being transported not only would the current location of the device 34 be known, but the direction in which the device 34 is moving may be inferred from the direction in which the device 34 has moved in, for example, the last five minutes. Thus, the position of the wireless device 34 may be saved each minute, for example, and the device 34 may be assumed to be moving linear to the direction in which the device 34 has moved from a time five minutes prior to the current time until the current time.

In yet another embodiment of the present invention, historical data may be gathered and used to assist in creating inferences. For example, when a particular information set is provided to a user via a wireless communication device 34, that user may be requested to make a selection from the listed information. Thus, where, for example, restaurant selections are provided to a particular wireless communication device 34 repeatedly and user selections are saved, the present invention may draw inferences from those selections. Where a user repeatedly selects restaurants offering French and Chinese food, the present invention may learn that those food types are preferred and provide, for example, restaurant listings for all restaurants lying within one-quarter of a mile of the wireless communication device's current location and restaurants offering Chinese and French food within a mile of the location of the wireless communication device 34.

A user may indicate his preferences by selecting one or more of the choices provided to him by the information service provider or any subset of the information provided by the information service provider. For example, a user may select a particular type of restaurant from a restaurant listing. Alternately, the user may choose to see information related to restaurants from a listing of, for example, restaurants, movie theaters, gas stations and banks. The user may furthermore request that a particular type of information such as restaurant information be provided when the user is in a particular location or at a particular time. Moreover, the user may request the different information such as night club information be provided when that user is in a different location.

To encourage a user to make selections from the listings provided to that user who might otherwise choose not to take the time to make a selection, the present invention may provide additional information related to a choice when that choice is selected. Thus for example, where a listing of restaurants is provided to a user and a particular restaurant is selected, a listing of menu choices featured at that restaurant may be provided. The user will therefore be enticed to make a selection in order to discover additional information related to a particular piece of information.

In another embodiment of the present invention, a profile of the normal user of a wireless communication device 34 that includes preferences of that user may be stored in a database of the present invention and inferences may be made therefrom. Thus where a user indicates via his preferences that he prefers French and Chinese foods, restaurants offering those kinds of foods may be emphasized as described in the previous example. Alternately, where a user prefers to be provided with information related to traffic routing and is not interested in information related to restaurants, information related to traffic routing may be provided to that user at all times of day and in all locations and information related to restaurants may not ever be provided to that user.

In another embodiment, the present invention comprises a computer system that collects information about the spatial location of a potential customer at a given time, compares said temporal and spatial information to a database of products and services, matches the aforesaid information with known data about the customer and offers the customer one or more products and services or suggests that the customer travel to or visit a nearby establishment at which such products and services can be obtained. In one embodiment of the present invention, the customer makes his needs known to the computer system by means of an interface so the above matching may be done without reference to previously known data about the customer.

The location of a customer can be obtained and transmitted to a computer system in numerous ways. In one embodiment of the invention, the customer caries a global positioning system (GPS) receiver or drives a vehicle having such a receiver. Information about the customer's location (for example, precise latitude and longitude) can then be transmitted to said computer system over the Internet, through wireless means or via telephone connection. In another embodiment, the customer carries a cellular telephone that is either on or is in standby mode. The telephone remains in radio contact with the local cellular telephone network, which is able to determine the customer location. The cellular telephone network can then transmit the customer's position to said computer system.

Time, another data element, is readily determined at the customer's location once said location is known.

Knowing the consumer's location enables the computer system to stand at the ready to assist the consumer with any query about the existence of nearby goods and services or with help in the event of any emergency, such as the individual falling ill or becoming the victim of a crime. In the event of illness, medical personnel can be alerted by the system as to the location and identity of the victim. The wireless communication device may also transmit information regarding the victims medical history or any other information related to that user. In the event of a crime, the police can be given a precise location to which to respond.

Time information can be used, for example, so that only stores that are known to be open at the moment will be recommended to the consumer.

If the individual desires a particular kind of food, the system can provide a list of restaurants offering that type of food within a three block walk. If the individual wants to buy a specific product, he can be informed as to which stores in the neighborhood carry the product, at what price, and whether or not it is currently in stock. The latter type of query can be answered by the system in real-time by looking up stores in an on-line (e.g. Internet) index and scanning their product offerings. If there is no indication whether the item is in stock, the store can be contacted directly by the system, or the user can be put in telephone or other contact with the store directly.

In the event the individual wants to make a purchase, the system can retain necessary financial information, such as credit card numbers, which can be furnished to the store by the system.

The service to be offered may be no more than the provision of information to the user, for a fee or otherwise. For example, the user may wish to know the arrival times of buses that pass near his present location, or the length of the line at the tell windows of a bank a few block away.

Using technology able to pinpoint a location to within a few feet, the invention can sense the location of the user within a supermarket and offer promotional or product information for items shelved in the aisle where the user is presently located.

The method of the present invention comprises the following steps:

1. Providing the user with a first signal transmitting means capable of transmitting a first signal and a second signal receiving means for receiving a second signal;
2. Providing a first signal receiving means for receiving said first signal at a location remote from said user;
3. Providing a location-determining means for determining from said first signal or the place of reception of said first signal an approximate location of the user;
4. Providing a computer system having access to location-based or time-based information concerning products or services, said system being connected to said first signal receiving means and said system being connected to a second signal transmitting means;
5. Transmitting said first signal;
6. Receiving said first signal;
7. Determining from said first signal an approximate location of said user;
8. Optionally determining from said first signal a need of said user for a product or service;
9. Determining an approximate time said first signal was sent;
10. Reviewing said location-based or time-based information in consideration of said approximate location or said approximate time and using said optionally determined need to generate a recommendation to be transmitted to said user; and
11. Transmitting said recommendation via said second signal transmitting means.

The various means described above are well known in the art. Said first signal transmitting means may be a cellular telephone enabled to send web-based information by means of the Wireless Application Protocol (WAP). Said first signal receiving means may be a computer connected to the cellular telephone network. Said second signal receiving means may also be said cellular telephone and said second signal transmitting means may be a computer connected to the cellular telephone network. Said location-determining means may be a GPS receiver or may be a means responsive to a location of a cellular telephone signal of sufficiently low strength that the origin of said signal can be localized to within a small radius, e.g. 100 yards.

In another embodiment, said first signal transmitting means and said second signal receiving means may both be a personal client computer connected to the Internet and said second signal transmitting means and said first signal receiving means may be a web server also connected to the Internet.

In another embodiment, said second receiving means is distant from said first transmitting means and said location information is transmitted to a third party. For example, the user may be a truck that is in transit and the product or service offering may be made to the home office of the company that operates the truck.

The apparatus of the present invention comprises a computer system that is able to send and receive information in communication with a device that is able to transmit location information and receive other data, as described above.

It is a benefit of the present invention that advertising, messages and product and service offerings can be directed to individuals based on the location of said individuals, thereby increasing the likelihood that said individuals will be interested in and will purchase said products and services.

It should be apparent that references to the Internet only comprise a subset of the potential embodiments of the present invention and that all that is required is some means for communicating between individual and server computers. Said communication means may include, but are not limited to, private leased networks, local area networks, wide area networks, cable television systems, cellular telephone systems, wireless communication systems, infrared systems and satellite systems.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of communicating information to a wireless communication device user, comprising:
   determining a location of the wireless device;
   predicting information potentially of interest to the user from the location of the wireless device, a time of day associated with the wireless device, and at least one preference of the user;
   automatically pushing the information potentially of interest to the user of the wireless device, wherein the automatic pushing is based upon at least the location of the wireless device;
   wherein the order in which the information is automatically pushed is based upon the at least one preference of the user;
   wherein the at least one preference of the user is predicted by utilizing a profile of preferences of the user; and
   wherein the profile of preferences of the user is obtained by ascertaining trends in selections made by the user.

2. A method of communicating information to a wireless communication device user, comprising:
   determining a location of the wireless device;
   predicting information potentially of interest to the user from the location of the wireless device, a time of day associated with the wireless device, and at least one preference of the user;
   automatically pushing the information potentially of interest to the user of the wireless device, wherein the automatic pushing is based upon at least the location of the wireless device;
   wherein the order in which the information is automatically pushed is based upon the at least one preference of the user;
   wherein the at least one preference of the user is predicted by utilizing a profile of preferences of the user; and
   wherein profile of preferences of the user is based upon historical data associated with the user.

3. A method of communicating information to a wireless device user, comprising:
   determining a location of the wireless device;
   predicting information potentially of interest to the user from the location of the wireless device, a time of day associated with the wireless device, and at least one preference of the user;
   automatically pushing the information potentially of interest to the user of the wireless device, wherein the automatic pushing is based upon at least the location of the wireless device;
   wherein the order in which the information is automatically pushed is based upon the at least one preference of the user;
   wherein the at least one preference of the user is predicted by utilizing a profile of preferences of the user; and
   wherein the profile of preferences of the user is obtained by ascertaining trends in selections made by the user and based upon historical data associated with the user.

4. A method of communicating information to a wireless device user, comprising:
   determining a location of the wireless device;
   predicting information potentially of interest to the user from the location of the wireless device, a time of day associated with the wireless device, and at least one preference of the user;
   automatically pushing the information potentially of interest to the user of the wireless device, wherein the automatic pushing is based upon at least the location of the wireless device and the order in which the information is automatically pushed is based upon the at least one preference of the user;
   encouraging the user to make a selection from an information set corresponding to the automatically pushed information; and
   storing information associated with the selection made in a database for subsequently predicting information potentially of interest to the user;
   wherein the at least one preference of the user is predicted by utilizing a profile of preferences of the user; and
   wherein the profile of preferences is obtained by ascertaining trends in selections made by the user and based upon historical data associated with the user.

5. The method according to claim 4 wherein the information potentially of interest comprises restaurant selections provided based upon at least one type of food preferred by the user.

6. The method according to claim 4 wherein the step of predicting information potentially of interest to the user further comprises:
   comparing known preference data associated with the user with a database of products and services; and
   matching products and services within the database with the known information.

7. The method according to claim 4, wherein the step of predicting information potentially of interest further comprises: where the at least one user preference is a preference for a restaurant of a particular style, the information potentially of interest will include a listing of restaurants contained in a database corresponding to the particular style located within a predetermined distance of the location of the wireless device.

8. The method according to claim 7 wherein the at least one user preference indicates a preference for a time of day when the restaurant of a particular style is preferred, the information potentially of interest will include a listing of restaurants contained in a database corresponding to the particular style located within a predetermined distance of the location of the wireless device.

9. The method according to claim 8 wherein the automatically pushed information comprises a list of no more than twenty of the restaurants predicted to be potentially of interest to the user.

10. The method according to claim 1 wherein the step of predicting information potentially of interest further comprises:

predicting information potentially of interest to the user from a surge in demand at a time proximate to the time of day associated with the wireless device, wherein the surge in demand is determined by detecting an increase in requests for information by other users at a location proximate to the location of the wireless device.

11. The method according to claim 10 wherein the information potentially of interest comprises both static and dynamic information.

12. The method according to claim 1 wherein the step of predicting information potentially of interest further comprises:

where the time of day associated with the wireless device is proximate to a peak traffic time for a location proximate to the location of the wireless device, alternate routes for commuting are included as information potentially of interest to the user.

13. The method according to claim 4 wherein the step of predicting information potentially of interest to the user further comprises:

utilizing the profile of preferences of the user by comparing repeated selections of a particular product with a database containing product providers that are both located proximately to the wireless device and offering the product to predict a potential preference of the user for that provider, wherein the potential preference and the provider are matched and further wherein at least one short message containing information associated with the product provider is utilized to represent the information potentially of interest to the user.

* * * * *